UNITED STATES PATENT OFFICE.

ALEXANDER S. RAMAGE, OF BUFFALO, NEW YORK, ASSIGNOR TO THE CHEMICAL DEVELOPMENT COMPANY, OF BUFFALO, NEW YORK, A CORPORATION OF COLORADO.

METHOD OF MAKING WHITE LEAD.

1,097,672.  Specification of Letters Patent.  Patented May 26, 1914.

No Drawing.  Application filed September 12, 1913.  Serial No. 789,532.

*To all whom it may concern:*

Be it known that I, ALEXANDER S. RAMAGE, a citizen of the United States, residing at Buffalo, in the county of Erie and State of New York, have invented certain new and useful Improvements in Methods of Making White Lead, of which the following is a specification.

It has been proposed heretofore (U. S. Patent No. 431,505, issued July 1, 1890, to Paul Bronner) to prepare white lead from normal lead sulfate by decomposing three equivalents of lead sulfate with two equivalents of caustic soda, forming thereby a basic sulfate of lead, and finally transforming this basic sulfate into basic carbonate by reaction with sodium carbonate, using "a small excess of soda beyond the quantity found by calculation." I have found however that the quantity of sodium carbonate necessary to complete this decomposition is practically double the equivalent, or double the quantity found by calculation; and if this amount were used without provision for its recovery the cost would be prohibitive. I have however found that by performing the reaction in the inverse direction, the same result as regards the preparation of basic carbonate of lead may be obtained without loss of reagents. By using approximately two equivalents of sodium carbonate to three equivalents of normal sulfate of lead, the mass reaction of the lead sulfate is sufficient to determine the complete conversion of the sodium carbonate, and I obtain a product as per the equation:—

$$3PbSO_4 + 2Na_2CO_3 = 2PbCO_3.PbSO_4 + 2Na_2SO_4.$$

I then treat this product, which corresponds approximately to the formula $$2PbCO_3.PbSO_4$$

and may be regarded either as a more or less definite compound or as a mixture of a carbonate and sulfate of lead, with two equivalents of caustic soda as per the following equation:

$$2PbCO_3.PbSO_4 + 2NaOH = 2PbCO_3.Pb(HO)_2 + Na_2SO_4.$$

The reaction is complete and the product is found to possess the proper physical properties of a basic carbonate of lead suited for use as a pigment.

In practice, I may place 909 pounds of pure white sulfate of lead in a tank, and add thereto a solution of sodium carbonate containing 212 pounds of the carbonate. The liquid is then boiled, preferably by steam, for half an hour or until the solution is found by test to be perfectly neutral. A solution containing 80 pounds of caustic soda is then added and the mixture agitated for about fifteen minutes. It will then be found that the precipitate is composed entirely of basic carbonate of lead, corresponding approximately to the formula $$2PbCO_3.Pb(HO)_2,$$

and that the solution contains only sodium sulfate.

I prefer to use a sodium carbonate solution of about fifteen per cent. concentration, and a caustic soda solution not above three per cent. concentration. The precipitate is allowed to settle and the clear solution of sodium sulfate is run off, and the sodium sulfate recovered in any of the known ways. The precipitated white lead is thoroughly washed with water which has been previously purified by treatment with a basic lead compound, the washing being continued until the filtrate shows no trace of sodium sulfate.

It should be understood that the proportions above mentioned may be considerably varied. An excess of caustic soda may be used without affecting the shade of the pigment, a matter of great importance when large quantities of materials are handled by the ordinary workman. In the method of Bronner above referred to, on the contrary, any slight excess of caustic soda immediately imparts a yellow shade to the basic sulfate, due to the formation of litharge.

I claim:—

The method of preparing basic carbonate of lead from lead sulfate, which consists in reacting upon lead sulfate with an alkali carbonate in less proportion than is required for the conversion of all of the sulfate into carbonate, and treating the resulting product with an alkali hydroxid.

In testimony whereof I affix my signature in presence of two witnesses.

ALEXANDER S. RAMAGE.

Witnesses:
WILFRED H. COOLING,
FARWELL LA TOUR.